(12) United States Patent
Song et al.

(10) Patent No.: US 12,024,252 B2
(45) Date of Patent: Jul. 2, 2024

(54) ELECTRIC BICYCLE

(71) Applicants: HYUNDAI MOTOR COMPANY, Seoul (KR); KIA CORPORATION, Seoul (KR)

(72) Inventors: Ilsun Song, Seongnam-si (KR); Donghee Seok, Suwon-si (KR); Duck Young Kim, Seongnam-si (KR); Hee Jin Ro, Seoul (KR); Yocheol Jang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 454 days.

(21) Appl. No.: 17/332,044

(22) Filed: May 27, 2021

(65) Prior Publication Data
US 2022/0126937 A1   Apr. 28, 2022

(30) Foreign Application Priority Data
Oct. 23, 2020   (KR) .......................... 10-2020-0138574

(51) Int. Cl.
*B62H 5/10* (2006.01)
*B62H 5/20* (2006.01)
*B62M 6/40* (2010.01)

(52) U.S. Cl.
CPC ................. *B62H 5/10* (2013.01); *B62H 5/20* (2013.01); *B62M 6/40* (2013.01)

(58) Field of Classification Search
CPC . B62H 5/10; B62M 6/40; B62M 6/45; B62M 6/50; H04L 63/0884
See application file for complete search history.

(56) References Cited

U.S. PATENT DOCUMENTS

| | | | |
|---|---|---|---|
| 10,577,834 B1* | 3/2020 | Luedtke | B62H 5/08 |
| 2023/0234535 A1* | 7/2023 | Yulish | B60R 25/06 |
| | | | 192/41 R |

* cited by examiner

*Primary Examiner* — Huan Le
(74) *Attorney, Agent, or Firm* — MCDONNELL BOEHNEN HULBERT & BERGHOFF LLP

(57) ABSTRACT

An electric bicycle includes a bicycle body, a pedal shaft rotatably installed on a pedal shaft support of the bicycle body, a driving sprocket rotatably installed on the pedal shaft, and a clutch device configured to connect the pedal shaft and the driving sprocket to enable power transmission or release the connection between the pedal shaft and the driving sprocket.

4 Claims, 6 Drawing Sheets

ELECTRIC BICYCLE

CROSS REFERENCE TO RELATED APPLICATIONS

This application is based on and claims priority under 35 U.S.C. § 119 to Korean Patent Application No. 10-2020-0138574, filed on Oct. 23, 2020, in the Korean Intellectual Property Office, the disclosure of which is incorporated by reference herein in its entirety.

BACKGROUND

1. Field

The disclosure relates to an electric bicycle capable of connecting a pedal shaft and a driving sprocket to enable power transmission or releasing the connection between the pedal shaft and the driving sprocket.

2. Description of the Related Art

Recently, a sharing service using personal mobility, such as an electric bicycle, has been developed. This is because when the destination is too close to require a vehicle, but too far to walk, a user may move easily without difficulty by using an electric bicycle or the like.

Typically, a shared electric bicycle includes a locking device that limits driving by restraining a wheel or the like when in a standby state or when use is not authenticated, and enables driving by unlocking the wheel or the like when use is authenticated.

However, such an electric bicycle may cause an inconvenience to the user because the locking device is exposed to the outside, and thus rust occurs on a clasp part of the locking device when used for a long period of time, thereby making a locking or unlocking operation unstable.

SUMMARY

It is an aspect of the disclosure to provide an electric bicycle capable of connecting a pedal shaft and a driving sprocket to enable power transmission or releasing the connection between the pedal shaft and the driving sprocket.

It is another aspect of the disclosure to provide an electric bicycle capable of replacing the function of a conventional locking device by connecting a pedal shaft and a driving sprocket when use is authenticated and releasing the connection between the pedal shaft and the driving sprocket when use is not authenticated.

Additional aspects of the disclosure will be set forth in part in the description which follows and, in part, will be obvious from the description, or may be learned by practice of the disclosure.

In accordance with an aspect of the disclosure, an electric bicycle includes a bicycle body, a pedal shaft rotatably installed on a pedal shaft support of the bicycle body, a driving sprocket rotatably installed on the pedal shaft, and a clutch device configured to connect the pedal shaft and the driving sprocket to enable power transmission or release the connection between the pedal shaft and the driving sprocket.

The electric bicycle may further include a controller configured to control such that the clutch device is connected when a user is authenticated and the connection of the clutch device is released when a user is not authenticated.

The electric bicycle may further include a wireless communication module configured to communicate with a control server through a wireless network, and a position measurement module configured to measure a position of the electric bicycle, wherein the controller may connect or disconnect the clutch device depending on user authentication information transmitted from the control server.

The clutch device may include a first rotation plate fixed to an outer surface of the pedal shaft to rotate together with the pedal shaft, a second rotation plate positioned to face the first rotation plate and spaced apart from the first rotation plate, rotatably installed on the outer surface of the pedal shaft and connected to rotate together with the pedal shaft, a friction disk supported on the second rotation plate movable in an axial direction so that the friction disk comes into contact with the first rotation plate by moving toward the first rotation plate, or is separated from the first rotation plate, and to rotate together with the second rotation plate, an excitation coil installed on the opposite side of the friction disk with the first rotation plate interposed therebetween to generate a magnetic force moving the friction disk toward the first rotation plate, and a restoration spring provided to separate the friction disk from the first rotation plate when the magnetic force generated by the excitation coil is dissipated.

The clutch device may further include a cover member provided to accommodate the first rotation plate, the second rotation plate, the friction disk, and the excitation coil.

The clutch device may further include a plurality of sliding pins coupled to a rear surface of the friction disk and slidably coupled to the second rotation plate.

The clutch device may include a rotation plate fixed to an outer surface of the pedal shaft to face the driving sprocket spaced apart from the driving sprocket and to rotate together with the pedal shaft, a friction disk supported on the driving sprocket to be movable in an axial direction to come into contact with the rotation plate by moving toward the rotation plate or to be separated from the rotation plate and to rotate together with the driving sprocket, an excitation coil installed on the opposite side of the friction disk with the rotation plate interposed therebetween to generate a magnetic force moving the friction disk toward the rotation plate, and a plurality of restoration springs provided to separate the friction disk from the rotation plate when the magnetic force generated by the excitation coil is dissipated.

The clutch device may further include a cover member provided to accommodate the rotation plate, the driving sprocket, the friction disk, and the excitation coil.

The clutch device may further include a plurality of sliding pins coupled to a rear surface of the friction disk and slidably coupled to the driving sprocket.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
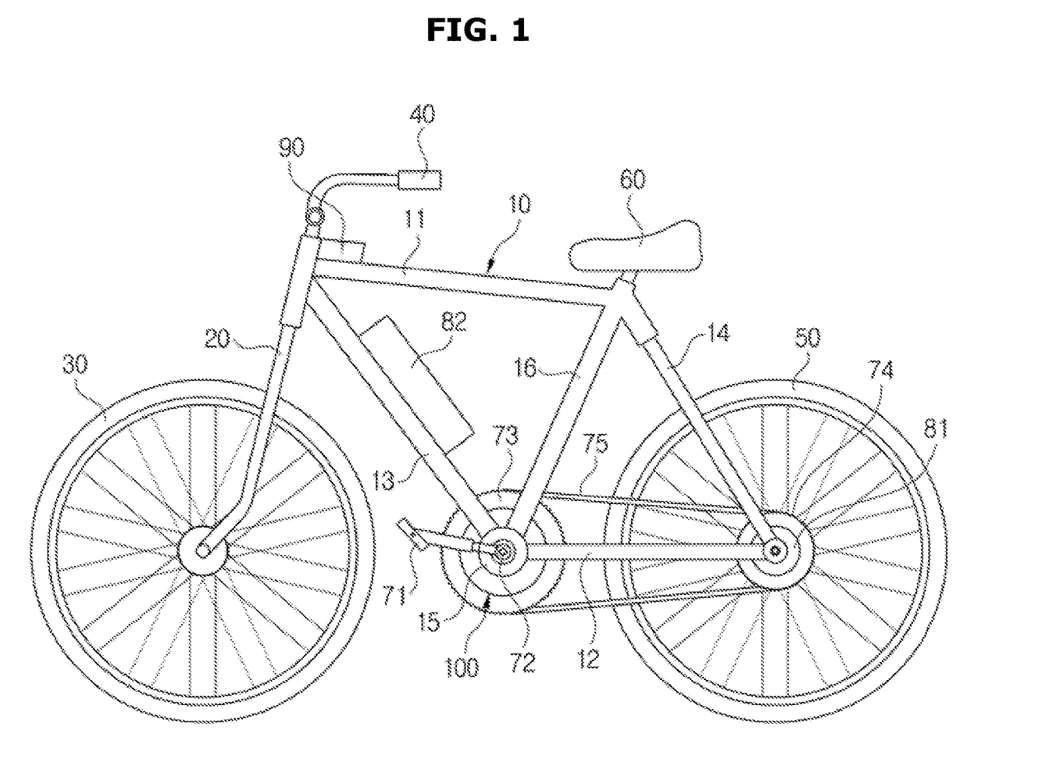
FIG. 1 illustrates an electric bicycle to which a clutch device according to a first embodiment of the disclosure is applied.

Referring to FIG. 1, an electric bicycle of a first embodiment may include a bicycle body 10 provided by combining a plurality of frames, a steering shaft 20 rotatably installed at a front end of the bicycle body 10, a front wheel 30 installed at a lower portion of the steering shaft 20, a steering handle 40 provided at an upper portion of the steering shaft 20, a rear wheel 50 installed at a rear end of the bicycle body 10, a seat 60 installed at an upper side of the bicycle body 10, a driving sprocket 73 provided at a lower side of a middle portion of the bicycle body 10 and rotated by an operation of a pedal 71, a driven sprocket 74 installed on a shaft of the rear wheel 50 and connected to the driving sprocket 73 by a chain 75, a driving motor 81 installed on the shaft of the rear wheel 50, and a battery 82 providing energy to the driving motor 81.

The electric bicycle as above may be driven by the operation of the pedal 71 by a user or driven by an operation of the driving motor 81 installed on the rear wheel 50.

The bicycle body 10 may be configured by connecting an upper frame 11, a lower frame 12, a front inclined frame 13, and a rear inclined frame 14 in a rhombus shape. The bicycle body 10 may include a seat frame 16 extending in a vertical direction (diagonal direction) to connect a position of the seat 60 and the pedal shaft support 15 in order to stably support the seat 60 while strengthening the rigidity.

The electric bicycle of the first embodiment may include a clutch device 100 to connect a pedal shaft 72 and the driving sprocket 73 to enable power transmission or to release the connection between the pedal shaft 72 and the driving sprocket 73, and a bicycle terminal 90 to control the clutch device 100.

Figure 2:
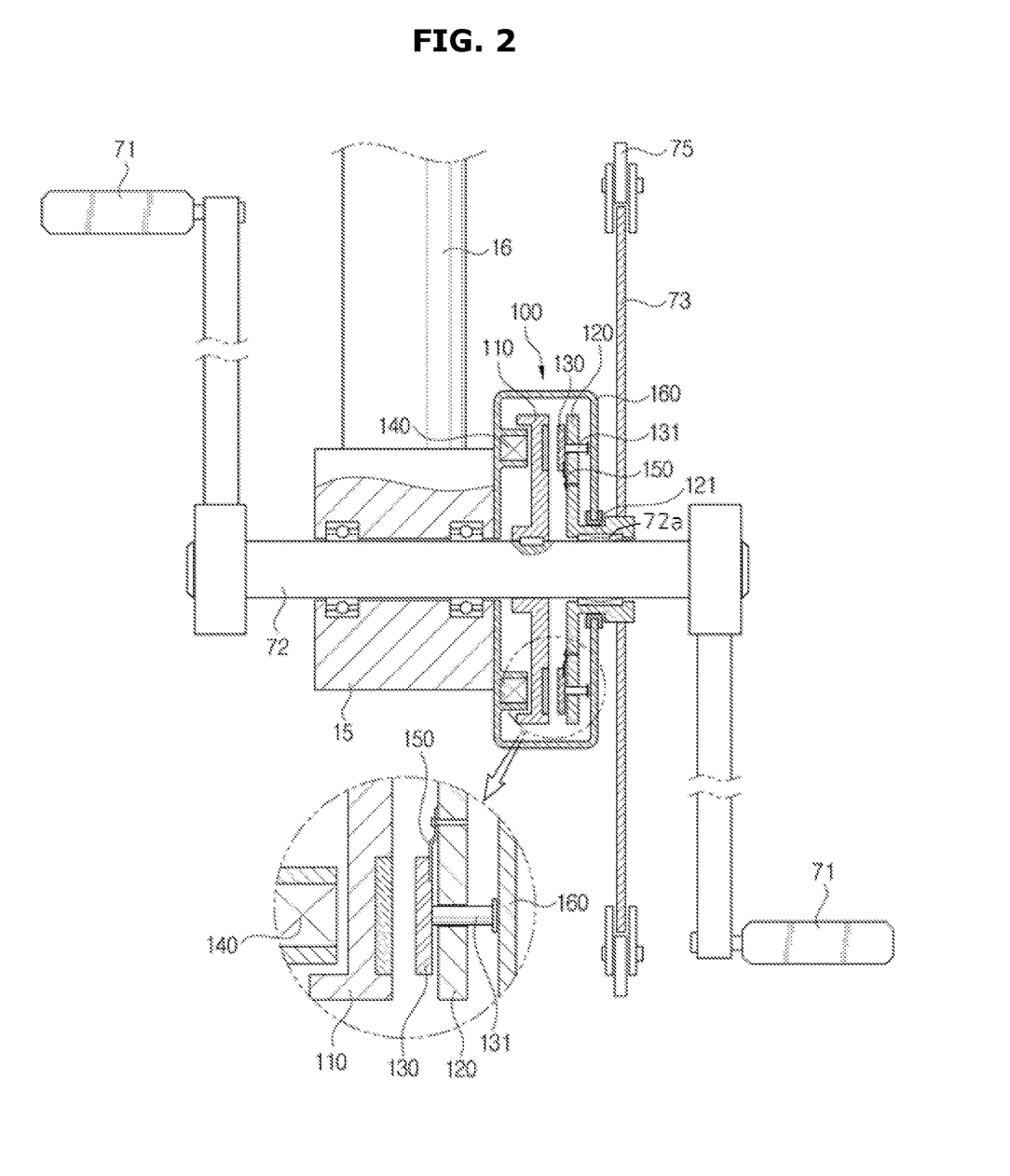
FIG. 2 is a cross-sectional view of the clutch device of the electric bicycle according to the first embodiment of the disclosure, illustrating a state in which connection between a pedal shaft and a driving sprocket is released.
Figure 3:
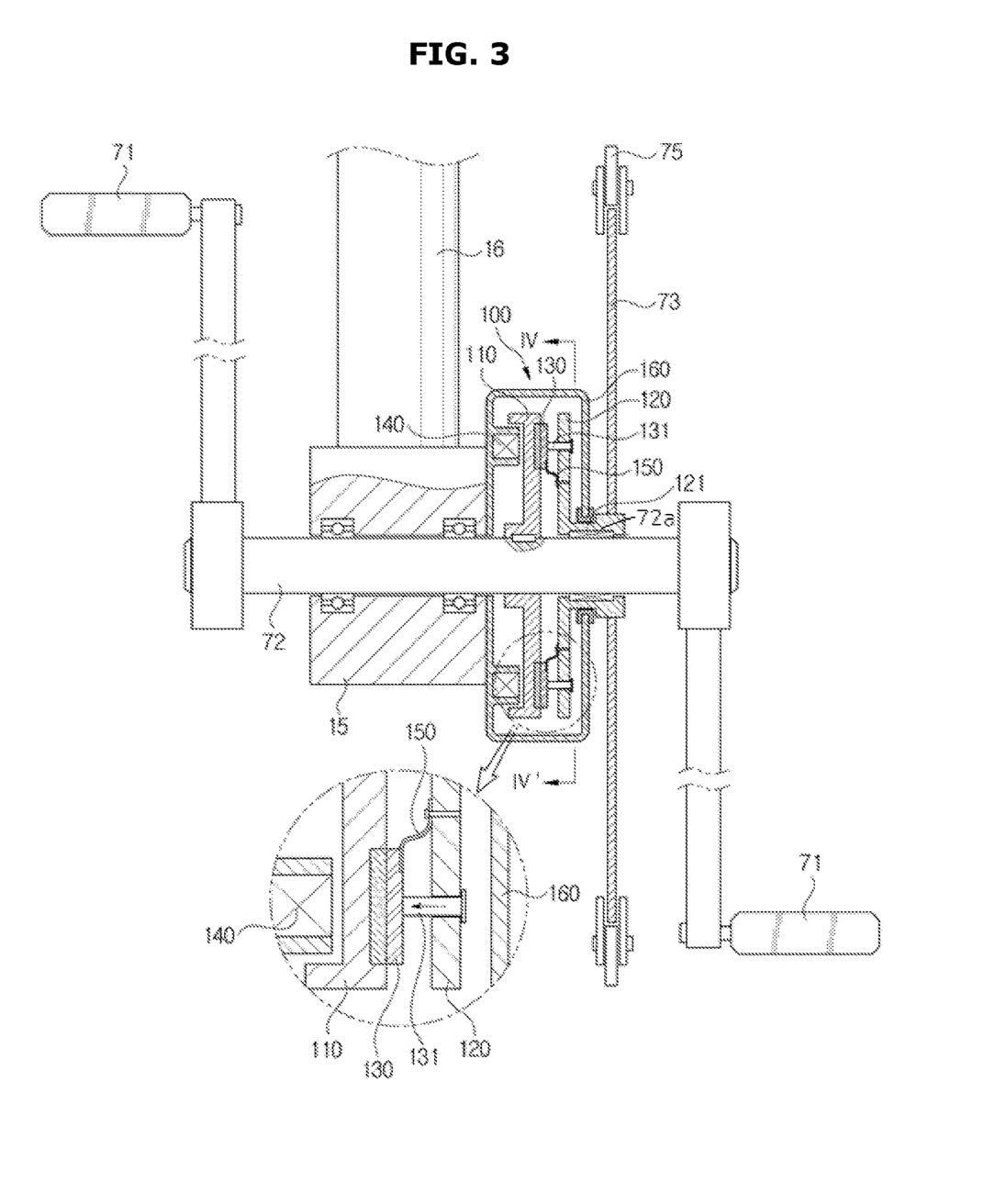
FIG. 3 is a cross-sectional view of the clutch device of the electric bicycle according to the first embodiment of the disclosure, illustrating a state in which the pedal shaft and the driving sprocket are connected.

Referring to FIGS. 2 and 3, the driving sprocket 73 is rotatably installed on an outer surface of the pedal shaft 72 by a bearing 72a or the like. The clutch device 100 is installed on the outer surface of the pedal shaft 72 between the driving sprocket 73 and the pedal shaft support 15 and may connect the pedal shaft 72 and the driving sprocket 73 to enable power transmission or to release the connection between the pedal shaft 72 and the driving sprocket 73. Accordingly, the driving sprocket 73 rotates together with the pedal shaft 72 when the pedal shaft 72 is rotated in a state in which the clutch device 100 is connected, and does not rotate when the pedal shaft 72 is rotated in a state in which the connection of the clutch device 100 is released.

The clutch device 100 may include a first rotation plate 110, a second rotation plate 120, a friction disk 130, an excitation coil 140, a restoration spring 150, and a cover member 160.

The first rotation plate 110 is provided in a disk shape, and is fixed to the outer surface of the pedal shaft 72 between the driving sprocket 73 and the pedal shaft support 15. Therefore, the first rotation plate 110 rotates together when the pedal shaft 72 rotates.

The second rotation plate 120 is provided in a disk shape having a size corresponding to the first rotation plate 110, and faces the first rotation plate 110 spaced apart from the first rotation plate 110. The second rotation plate 120 is rotatably supported on the outer surface of the pedal shaft 72, and is connected to the driving sprocket 73 by a hollow connection shaft 121 installed on the outer surface of the pedal shaft 72. Accordingly, the driving sprocket 73 and the second rotation plate 120 may rotate together in a state of being rotatably supported on the outer surface of the pedal shaft 72.

Figure 4:
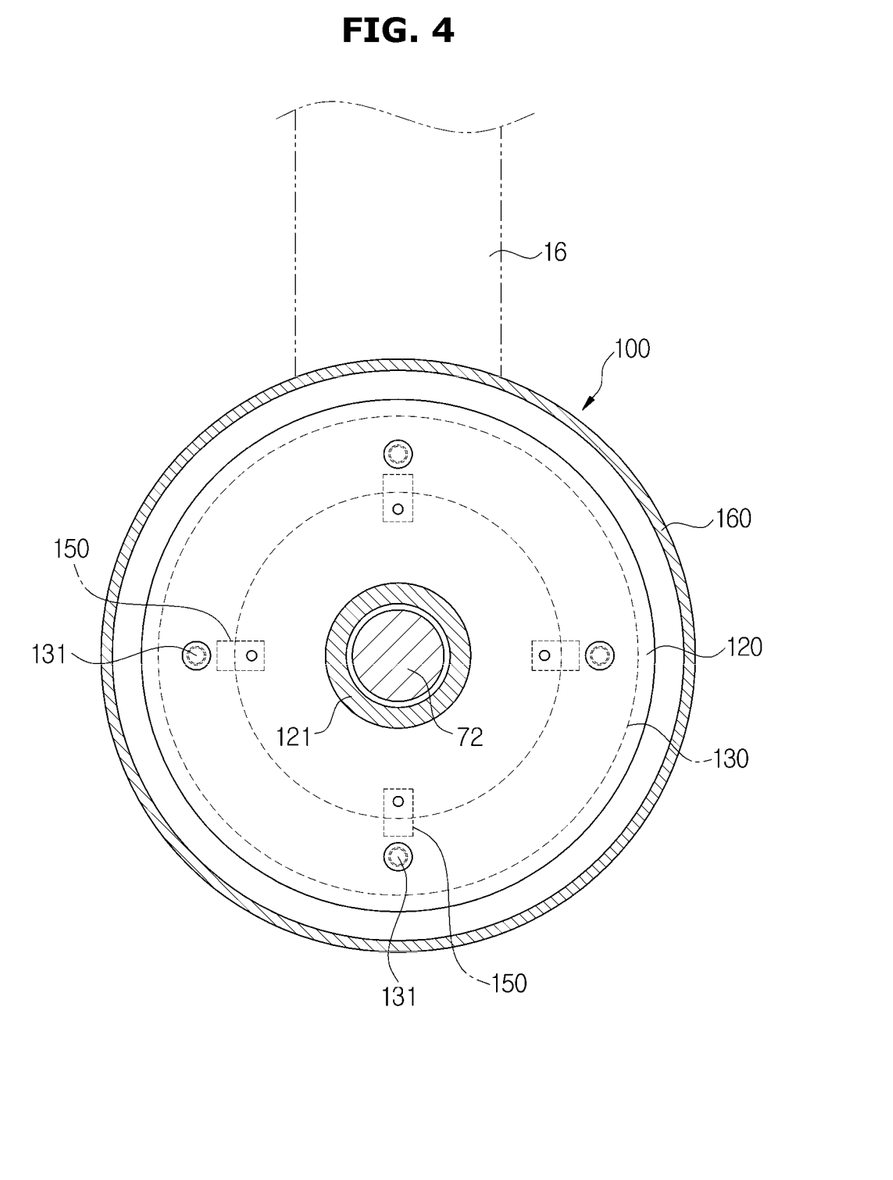
FIG. 4 is a cross-sectional view taken along line IV-IV' in FIG. 2.

Referring to FIGS. 3 and 4, the friction disk 130 is installed between the first rotation plate 110 and the second rotation plate 120. The friction disk 130 is supported on the second rotation plate 120 to be movable in an axial direction so that the friction disk 130 may come into close contact with the first rotation plate 110 by moving toward the first rotation plate 110 or may be separated from the first rotation plate 110. A plurality of sliding pins 131 capable of advancing and retreating in the axial direction are installed on the second rotation plate 120, and the friction disk 130 has a rear surface fixed to the plurality of sliding pins 131. Accordingly, the friction disk 130 rotates together with the second rotation plate 120 in a state of being able to advance and retreat in the axial direction.

The excitation coil 140 is installed on the opposite side of the friction disk 130 with the first rotation plate 110 interposed therebetween. The excitation coil 140 is maintained spaced apart from the first rotation plate 110 so that the first rotation plate 110 is rotatable. The excitation coil 140 generates a magnetic force moving the friction disk 130 toward the first rotation plate 110 when power is applied. When the friction disk 130 comes into close contact with the first rotation plate 110 by an operation of the excitation coil 140, rotational power is transmitted from the first rotation plate 110 to the second rotation plate 120.

The restoration spring 150 separates the friction disk 130 from the first rotation plate 110 when the magnetic force generated by the excitation coil 140 is dissipated, so that the connection between the first rotation plate 110 and the second rotation plate 120 is blocked. The restoration spring 150 may be a plate spring installed on the second rotation plate 120.

The cover member 160 may be fixed to the pedal shaft support 15, and accommodates the first rotation plate 110, the second rotation plate 120, the friction disk 130, and the excitation coil 140 in a sealed state. The excitation coil 140 may be fixed to an inner surface of the cover member 160. The cover member 160 may protect the clutch device 100 from corrosion by preventing foreign substances such as rain and dust from entering the inside thereof.

In the clutch device 100 as above, as illustrated in FIG. 3, when power is applied to the excitation coil 140 to generate a magnetic force, the friction disk 130 comes into close contact with the first rotation plate 110 by moving toward the first rotation plate 110. Therefore, in this case, the first rotation plate 110 and the second rotation plate 120 are connected to rotate together, and the rotational power of the pedal shaft 72 is transmitted to the driving sprocket 73. Also, in the clutch device 100, as illustrated in FIG. 2, when the magnetic force generated by the excitation coil 140 is dissipated, the friction disk 130 is spaced apart from the first rotation plate 110 by an operation of the restoration spring 150. Therefore, in this case, the rotational power of the pedal shaft 72 is not transmitted to the driving sprocket 73.

The bicycle terminal 90 may check whether a user is authenticated when an electric bicycle is rented, connect the clutch device 100 when the user is authenticated, and release the connection of the clutch device 100 when the user is not authenticated.

Figure 5:
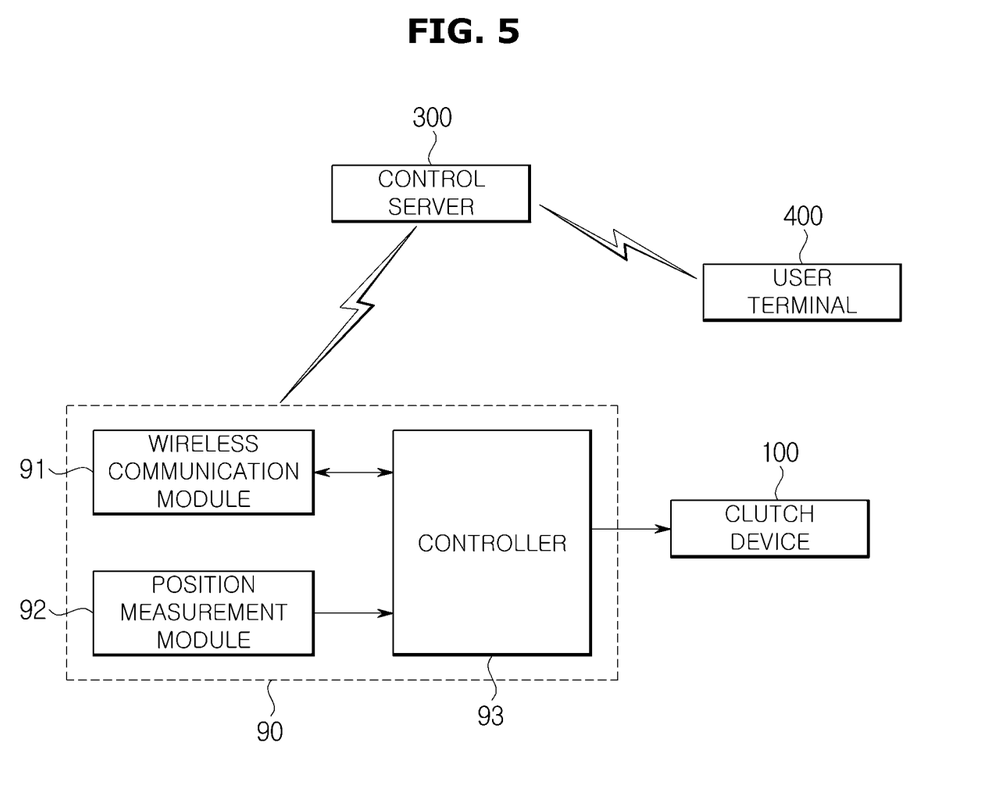
FIG. 5 is a block diagram illustrating a configuration for controlling the clutch device of the electric bicycle according to the first embodiment of the disclosure.

Referring to FIG. 5, the bicycle terminal 90 may include a wireless communication module 91 to communicate with a control server 300 through a wireless network, a position measurement module 92 to measure a position of the electric bicycle, and a controller 93 to connect or disconnect the clutch device 100 depending on user authentication information transmitted from the control server 300.

The controller 93 may connect the clutch device 100 by applying power to the excitation coil 140 when a user is authenticated, and release the connection of the clutch device 100 by releasing the power supply of the excitation coil 140 when a user is not authenticated.

A user who wants to rent and use an electric bicycle may request user authentication from the control server 300 through a user terminal 400, and the control server 300 may transmit information on whether or not to use authentication to the corresponding bicycle terminal 90 by considering member information, payment information, and the like.

The user terminal 400 may be a smartphone installed with a rental service app (APP) or various portable terminals capable of wireless communication.

The electric bicycle may replace the function of a conventional locking device because the clutch device 100 connects the pedal shaft 72 and the driving sprocket 73 when use is authenticated, and releases the connection between the pedal shaft 72 and the driving sprocket 73 when use is not authenticated.

Figure 6:
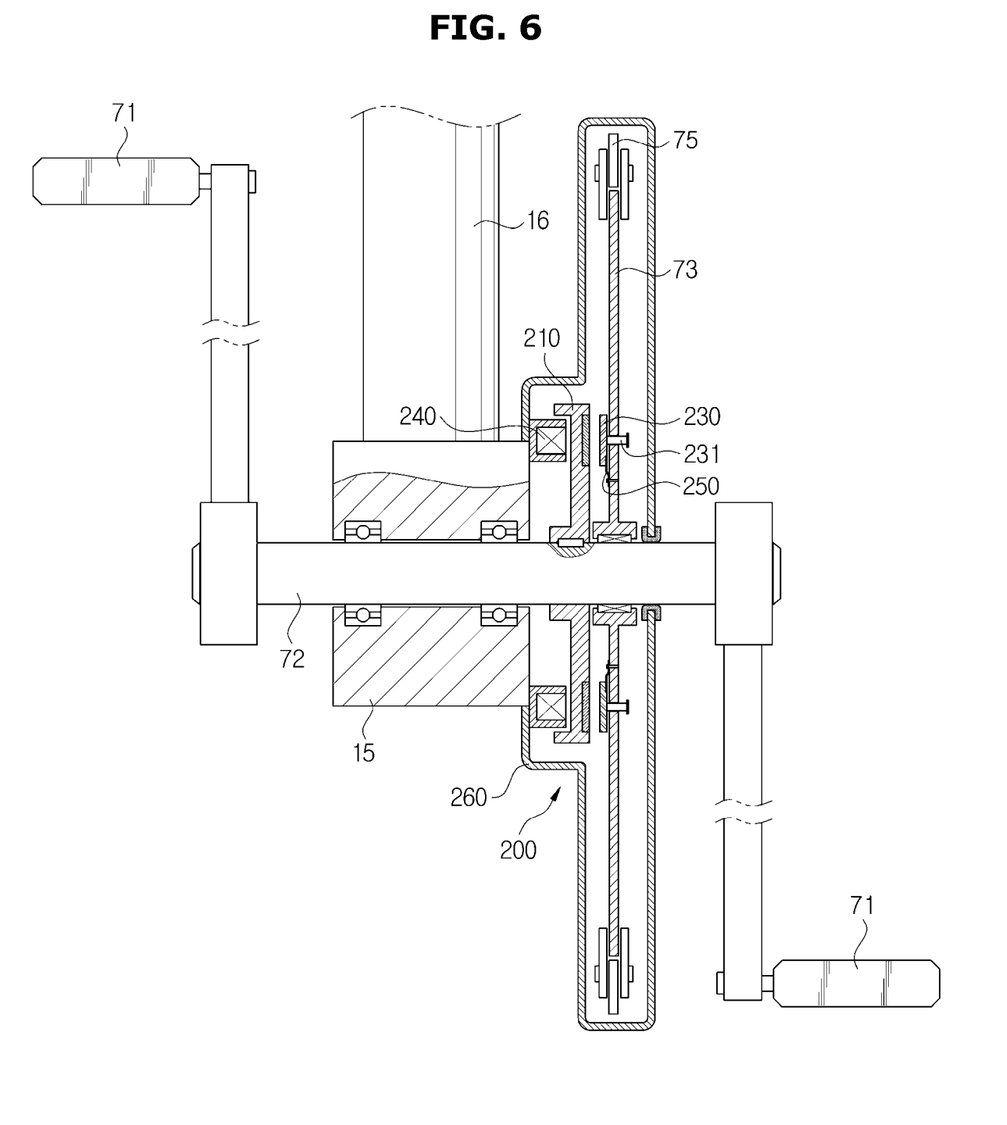
FIG. 6 is a cross-sectional view of a clutch device of an electric bicycle according to a second embodiment of the disclosure.

FIG. 6 is a cross-sectional view of a clutch device of an electric bicycle according to a second embodiment of the disclosure.

A clutch device 200 according to a second embodiment may include a rotation plate 210 fixed to the outer surface of the pedal shaft 72 to face the driving sprocket 73 spaced apart from the driving sprocket 73 and to rotate together with the pedal shaft 72, a friction disk 230 supported on the driving sprocket 73 movable in an axial direction by a plurality of sliding pins 231 to come into close contact with the rotation plate 210 by moving toward the rotation plate 210 or to be separated from the rotation plate 210 and to rotate together with the driving sprocket 73, an excitation coil 240 installed on the opposite side of the friction disk 230 with the rotation plate 210 interposed therebetween to generate a magnetic force moving the friction disk 230 toward the rotation plate 210, and a plurality of restoration springs 250 installed on the driving sprocket 73 to separate the friction disk 230 from the rotation plate 210 when the magnetic force generated by the excitation coil 240 is dissipated.

The clutch device 200 of the second embodiment is different from the clutch device 100 of the first embodiment in that the friction disk 230 is mounted to the driving sprocket 73 to advance and retreat in the axial direction. However, the operation of the clutch device 200 as above may be substantially the same as in the first embodiment.

The clutch device 200 according to the second embodiment includes a cover member 260 to accommodate the rotation plate 210, the driving sprocket 73, the friction disk 230, and the excitation coil 240. The cover member 260 may be integral with a chain cover accommodating the chain 75 of the electric bicycle.

As is apparent from the above, an electric bicycle according to an embodiment of the disclosure can connect a pedal shaft and a driving sprocket to enable power transmission or release the connection between the pedal shaft and the driving sprocket by operating a clutch device as needed.

Further, the electric bicycle according to an embodiment of the disclosure can replace the function of a conventional locking device because the clutch device connects the pedal shaft and the driving sprocket when use is authenticated and releases the connection between the pedal shaft and the driving sprocket when use is not authenticated.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

The invention claimed is:

1. An electric bicycle comprising:
 a bicycle body;
 a pedal shaft rotatably installed on a pedal shaft support of the bicycle body;
 a driving sprocket rotatably installed on the pedal shaft;
 a clutch device configured to connect the pedal shaft and the driving sprocket to enable power transmission, or to release the connection between the pedal shaft and the driving sprocket; and
 a controller configured to connect the clutch device when a user is authenticated, and to release the clutch device when a user is not authenticated;
 wherein the clutch device comprises:
  a first rotation plate fixed to an outer surface of the pedal shaft to rotate together with the pedal shaft;
  a second rotation plate facing the first rotation plate and being spaced apart from the first rotation plate, rotatably installed on the outer surface of the pedal shaft and connected to rotate together with the pedal shaft;
  a friction disk supported on the second rotation plate to be movable in an axial direction so that the friction disk comes into contact with the first rotation plate by moving toward the first rotation plate, or to be separated from the first rotation plate, and to rotate together with the second rotation plate;
  an excitation coil installed on the opposite side of the friction disk with the first rotation plate interposed therebetween to generate a magnetic force moving the friction disk toward the first rotation plate; and
  a restoration spring separating the friction disk from the first rotation plate when the magnetic force generated by the excitation coil is dissipated.

2. The electric bicycle according to claim 1, further comprising a wireless communication module configured to communicate with a control server through a wireless network, and a position measurement module configured to measure a position of the electric bicycle,
 wherein the controller connects or disconnects the clutch device depending on user authentication information transmitted from the control server.

3. The electric bicycle according to claim 1, wherein the clutch device further comprises a cover member configured to accommodate the first rotation plate, the second rotation plate, the friction disk, and the excitation coil.

4. The electric bicycle according to claim 1, wherein the clutch device further comprises a plurality of sliding pins coupled to a rear surface of the friction disk and slidably coupled to the second rotation plate.

\* \* \* \* \*